(12) United States Patent
Ingling

(10) Patent No.: US 12,091,794 B2
(45) Date of Patent: Sep. 17, 2024

(54) SYSTEMS AND METHODS FOR PRODUCING TEXTILES

(71) Applicant: Carl Thomas Ingling, Brimfield, MA (US)

(72) Inventor: Carl Thomas Ingling, Brimfield, MA (US)

(*) Notice: Subject to any disclaimer, the term of this patent is extended or adjusted under 35 U.S.C. 154(b) by 23 days.

(21) Appl. No.: 17/772,934

(22) PCT Filed: Oct. 29, 2019

(86) PCT No.: PCT/US2019/058451
§ 371 (c)(1),
(2) Date: Apr. 28, 2022

(87) PCT Pub. No.: WO2021/086316
PCT Pub. Date: May 6, 2021

(65) Prior Publication Data
US 2022/0413466 A1    Dec. 29, 2022

(51) Int. Cl.
| | |
|---|---|
| *D05B 19/00* | (2006.01) |
| *D06H 7/00* | (2006.01) |
| *D06P 7/00* | (2006.01) |
| *G05B 19/4155* | (2006.01) |

(52) U.S. Cl.
CPC .......... *D05B 19/00* (2013.01); *D06H 7/00* (2013.01); *D06P 7/00* (2013.01); *G05B 19/4155* (2013.01); *G05B 2219/45195* (2013.01)

(58) Field of Classification Search
CPC .......... B26D 5/005; B26D 5/007; D06H 7/00; D06H 2201/00; D05B 19/02; D05B 19/12; D05B 19/16; D05B 19/00; D05C 13/00; D05C 11/24

USPC .................................................. 700/130–138
See application file for complete search history.

(56) References Cited

U.S. PATENT DOCUMENTS

| | | | |
|---|---|---|---|
| 7,561,939 B2 | 7/2009 | Kawabe et al. | |
| 7,657,340 B2* | 2/2010 | Lind | A41H 3/007 700/130 |
| 9,139,382 B2* | 9/2015 | Thorpe | B65G 51/02 |
| 9,542,069 B2* | 1/2017 | Mulligan | G06Q 30/0621 |
| 10,307,926 B2* | 6/2019 | Aminpour | B65H 29/241 |
| 2007/0107572 A1* | 5/2007 | Pommier | A41H 43/0292 83/29 |
| 2015/0066189 A1* | 3/2015 | Mulligan | G06Q 30/0621 700/136 |

(Continued)

FOREIGN PATENT DOCUMENTS

WO    2017191637 A1    11/2017

OTHER PUBLICATIONS

International Search Report and Written Opinion dated Jan. 27, 2020 for PCT Application No. PCT/US2019/058451, 21 pages.

*Primary Examiner* — Danny Worrell
(74) *Attorney, Agent, or Firm* — Benesch Friedlander Coplan & Aronoff LLP

(57) ABSTRACT

Systems and methods for producing printed goods from textile material to address shortcoming of existing approaches for article production. According to the systems and methods described herein, the harvested and woven cotton may be shipped directly to garment decorators who may perform all remaining steps to provide customers with finished goods. As such, the systems and methods herein may eliminate the steps of the blank goods trade and current manufacturing processes.

20 Claims, 4 Drawing Sheets

(56) References Cited

U.S. PATENT DOCUMENTS

2015/0208746 A1* 7/2015 Schindler ............... A41H 3/007
                                                          700/132
2016/0194792 A1   7/2016 Satharasinghe et al.
2017/0259445 A1   9/2017 Aminpour
2018/0257807 A1   9/2018 Kian et al.

* cited by examiner

SYSTEMS AND METHODS FOR PRODUCING TEXTILES

CROSS-REFERENCE TO RELATED APPLICATIONS

The present application is a U.S. National Stage Entry of PCT International Patent Application No. PCT/US2019/058451 entitled "SYSTEMS AND METHODS FOR PRODUCING TEXTILES," filed on Oct. 29, 2019, the disclosure of which is hereby incorporated by reference in its entirety.

TECHNICAL FIELD

Systems and methods are described herein for producing printed goods from textile material. In some examples, systems and methods are described herein for automated printing, cutting, and assembly of textiles.

BACKGROUND

Currently in the article industry (e.g., the apparel industry) a common mode of operation is that decorators start with purchased blank goods. "Blank goods" may include items such as completed items (e.g., garments) in which the fabric was dyed or a fabric pattern was printed on uncut cloth, the fabric was cut in a sewing pattern, and sewn.

SUMMARY

Systems and methods are described herein for producing printed goods from textile material.

In an example, a method may include receiving, at the management tool, image data. The image data may include a colorization of all elements of a textile product in a shape of a sewing pattern for the textile product. The method may include transmitting the image data to a digital textile printer, creating, at the digital textile printer, prints on textile material to generate printed textile material based on the image data. The printed textile material may include the shape of the sewing pattern. The method may include providing, at the digital textile printer, the printed textile material to a numeric control textile cutter, synchronizing a material transit rate of the digital textile printer with a material transit rate of the numeric control textile cutter, registering cuts made by the numeric control textile cutter to the shape of the sewing pattern, cutting, at the numerical control textile cutter, the shape of the sewing pattern to create cut sewing pattern pieces, transferring the cut sewing pattern pieces to a robotic sewing system, receiving, at the robotic sewing system, information for assembling a sewn textile product out of the cut sewing pattern pieces, assembling, at the robotic sewing system, the textile product from the cut sewing pattern pieces to create an article, and providing the article of the textile product.

This Summary is provided merely for purposes of summarizing some example embodiments to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

Features, objects and advantages other than those set forth above will become more readily apparent when consideration is given to the detailed description below. Such detailed description makes reference to the following drawings.

DETAILED DESCRIPTION

Figure 1:
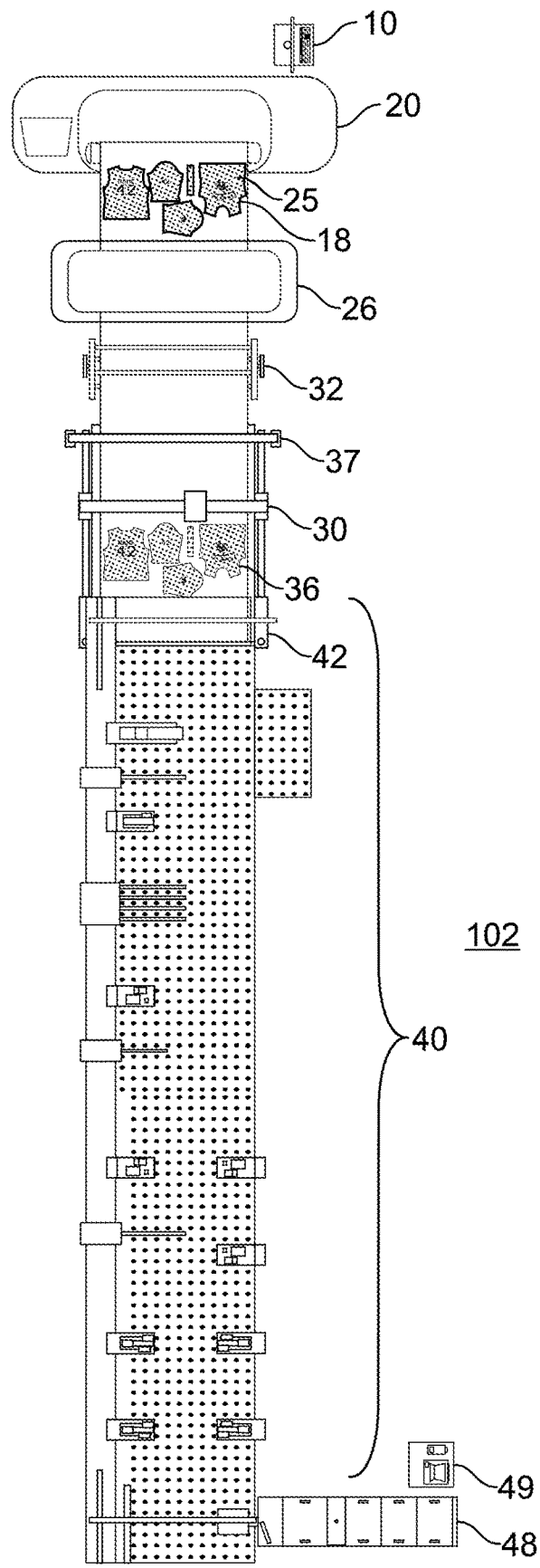
FIG. 1 illustrates an exemplary environment for implementing the systems and methods described herein for producing textiles.

Generally, textiles are manufactured as blank goods, which are not decorated with items such as text and/or graphics specifically positioned on the finished goods. The blank goods is then sold by the manufacturer to a decorator. The decorator adds text and/or graphics to the blank goods through processes such as screen printing, direct to garment printing, print-and-cut vinyl transfers, dye sublimation, and/or other methods. The typical example is the printed tee shirt. Three existing technologies in textile manufacture have only recently reached a state of development allowing them to practically and cost effectively be used in combination to mass manufacture individual customized items. These three technologies are digital textile printing, numeric control textile cutting, and robotic sewing.

Digital textile printers that may print direct to substrate were first released circa 1994, but costs were exorbitant, speeds were slow, and wash-fastness was poor. However, the setup costs for the traditional rotary screen printing method of colorizing a textile with a pattern are high and must be amortized across the run size. For extremely small runs for creating prototype textile products, the screen printing cost is very high. Thus, the new digital textile printers found a niche. The primary use case was the creation of one-off prototypes for the fashion industry for developing new lines of clothing prior to mass production. Innovation began to accelerate in the early 2000's with improving inkjet technologies and inks. The first digital textile printing systems aimed at low-run size mass production became available around 2003. For any given run of textile printing, there is a "break even" point where, for a given number of colors, rotary screen printing is still less expensive for runs over a certain size. Digital textile printing is cheaper for runs under that size. Costs for digital textile printing have continued to fall dramatically, and by at least 2014 digital printing was becoming competitive for all small runs and into many medium sized runs of printed fabric.

Current marginal costs for roll digital textile printing to white stock for 1 square meter of coverage (the approximate fabric area of an entire medium sized adult tee shirt) are now in-line with the costs of ink for a Direct To Garment print at a typical 144 square inches of ink coverage (the area of just the art printed on an already-colorized blank good), including the costs of a white ink and pretreatment for the Direct To Garment print. It is a recent development that the supply costs for digital textile printing are no longer prohibitive for production runs of retail goods. Additionally, costs are falling rapidly, and are falling much more rapidly than for competing processes. So digital textile printing could continue to become more cost competitive relative to alternatives in the future. Additionally, early digital textile printers that could print lasting prints on a variety of popular textiles such as cotton utilized dye or acid based inks, which require extensive post-treatment steps and create waste water. Newer pigment based textile inks for digital textile printers that work on most substrates and require only heat curing became widely available in the 2010's.

The first computer numeric control textile cutter was developed by Gerber in 1967, with the first production unit introduced in 1970. Development concentrated on cutting fabric for mass manufacturing, thus innovation concentrated on relatively slow moving cutters capable of multi-ply cutting of often hundreds of layers at a time. These cutters required multi-layer stacks of compressed material in order to achieve enough material rigidity to prevent material deformation by the cutter head, and could not hold a single layer of flexible textile material firmly in relation to the cutter in order to perform precise cuts. The introduction of vacuum tables to computer numeric control textile cutters in the 1990's allowed the development of single ply textile cutters. However, these machines were still relatively slow, required the loading and unloading of single sheets of material at a time, and targeted prototyping, not production.

It wasn't until 2011 that a belt-feed vacuum table was combined with a high-speed single ply cutter to produce a continuous throughput computer numeric control cutting system capable of cost competitive cuts of sewing patterns for single garments for retail sale.

Another recent development is a robotic sewing line, which came to market in 2017. Development of this technology, which may observe the position, orientation, and deformation of cut fabric panels as they move through the process and adjust to correct for the deformations like a human can, required the development of practicable deep convolutional neural networks, which have only been available since 2012.

Much of the world's cotton supply is grown in the United States, and much of it is woven into fabric in the United States. Most of it is then transported oversees to be dyed or roll printed with a pattern, cut and sewn into blank goods, then shipped back to the States. The blank goods are then warehoused, shipped to local distributors, warehoused again, and finally sold and transported again to a garment decorator.

Once mass manufactured finished blank goods arrive at the decorator, they may likely be counted in and then warehoused again while awaiting production scheduling. Take for example the typical common order of uniform shirts for a small sports team. Assume a blue tee shirt with a multi-color print on the front and individual names and numbers for each team member on the back. With the same graphic (a team logo) going on the fronts of all the shirts, a screen printing process may commonly be used for the front decoration. Professional artists may separate the graphic by color into registered plates for printing, including a retracted white under base when printing colored items. Next, repeated for each color in the art, screens have emulsion applied and dried, transparencies are printed, a transparency mask is secured to the emulsion and then burned onto the emulsion with a UV exposure unit, the unexposed emulsion is washed away with a pressure washer to reveal the mask, the screen is loaded into a screen printing machine, the screen is inked, a clean squeegee and flood bar are loaded, and the screen is registered to the other colors. Printing commences, with each shirt manually loaded onto the machine, the shirt passing through a separate station for each color printed one at a time, plus one or more flash dryer units, and then manually unloaded to a conveyor dryer.

Once the shirts are all printed with all colors on the screen printing press, the squeegees and flood bars must be removed and cleaned, and the screens must be removed and prepared for reuse by having the ink and emulsion removed in a multi-step process that is energy, chemical, and labor intensive. The shirts are retrieved from the conveyor dryer, folded, grouped, and moved to a different department for the application of individual vinyl names and numbers to the backs. A digital vinyl cutter cuts each name and number. The excess vinyl is weeded off of each name and number by hand and disposed of. Then each shirt is individually loaded onto a heat press, the name and numbers are manually positioned, and then pressed to the garment. The garment is allowed to cool, the backing material is manually peeled away and disposed of, and the garment is finally finished.

Alternatively, Direct to Garment printers may be used instead of the screen printing process for decoration. Direct To Garment printing eliminates the high setup costs of screen printing, but incurs much higher per-print costs. The substrate textile is already colored on the finished goods and must be printed over, so Direct to Garment (DTG) printing typically uses a 5-part process. First the fabric is pretreated to stop the inks from being absorbed by the fabric. For most DTG systems, the pretreatment is then heat dried. Then expensive white ink containing titanium-dioxide is printed to create any white art and serve as an opaque base for the transparent colored inks. Then the CMYK inks are printed. Finally, the inks are heat cured. Direct to Garment printing eliminates the expensive setup process of screen printing, but incurs much higher per print costs because the production speed of even the most expensive Direct to Garment printers on the market is much slower than even the cheapest automatic screen printing presses, and the consumables cost (pretreatment, white ink, and colored inks) are much higher than for screen printing.

Systems and methods are described herein that improve on existing approaches by inverting the order of the decorating step and thereby accomplish the decorating step at a beginning of a fabricating process, concurrently with any fabric colorization/fabric patterning. According to the systems and methods described herein, image data 8 may be prepared in advance for each shirt design, containing shirt background color(s) and/or pattern(s) in conjunction with any text or graphic elements, all positioned correctly within the sewing pattern for placement on the finished good. In the above team shirt example, image data 8, such as a computer image file, may be created containing a template of the sewing pattern. The entire area of the sewing pattern may be colored the desired blue. Then the team logo may be positioned on the image for the sewing pattern piece for the front and a name and number positioned on the image for the sewing pattern piece for the back. Separate image data 8 may be created for each shirt (or for each element of the sewing pattern for each shirt), in order to account for the differences in shirt size affecting the sewing pattern, and the individual names and numbers. This image data 8 may be utilized as input for the systems and methods described herein. In some instances, the image data might extend beyond the edges of the sewing pattern to allow for tolerances in cutting and sewing.

Figure 2A:
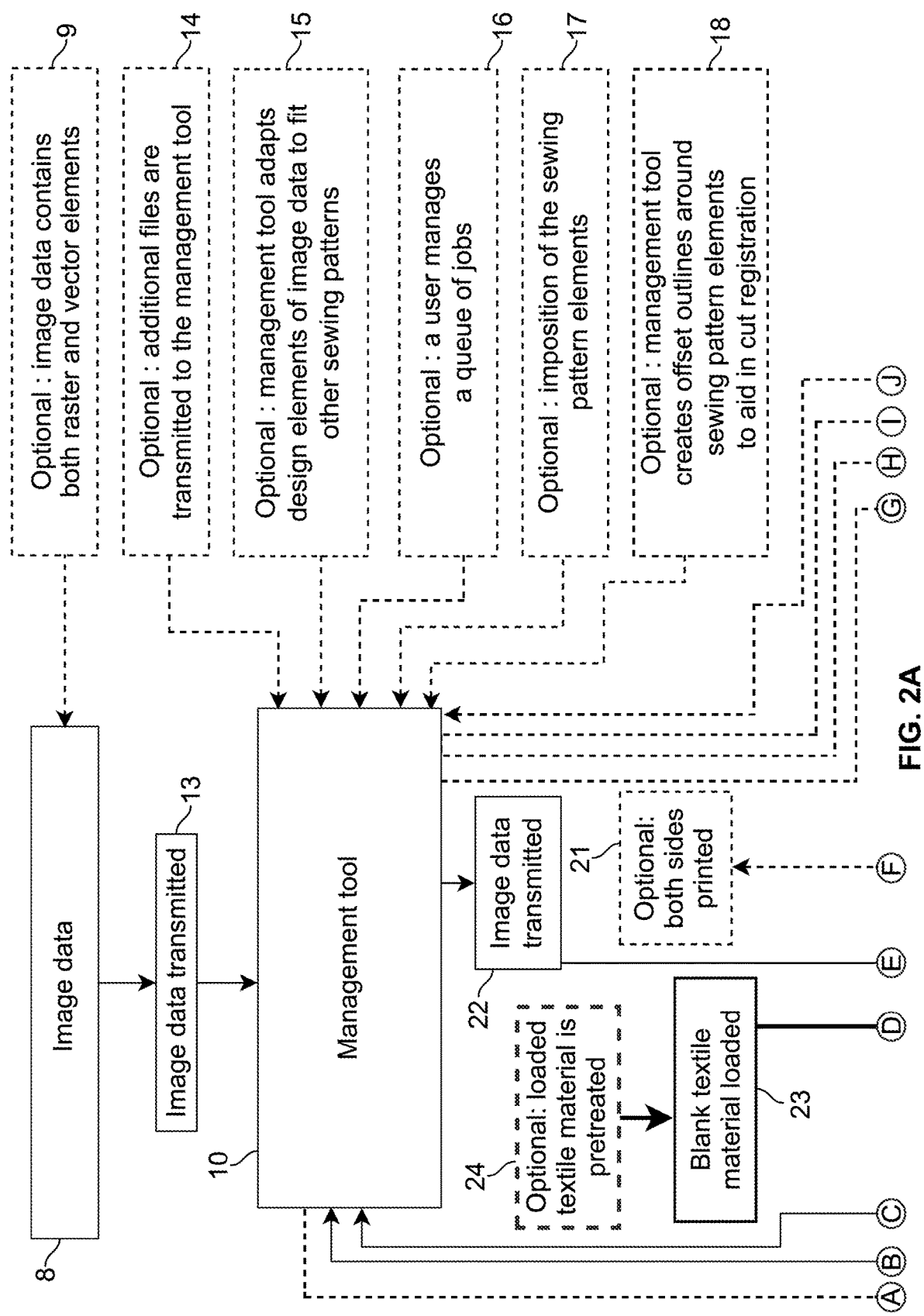
FIG. 2 is another exemplary environment for implementing the systems and methods described herein for producing textiles.
Figure 2B:
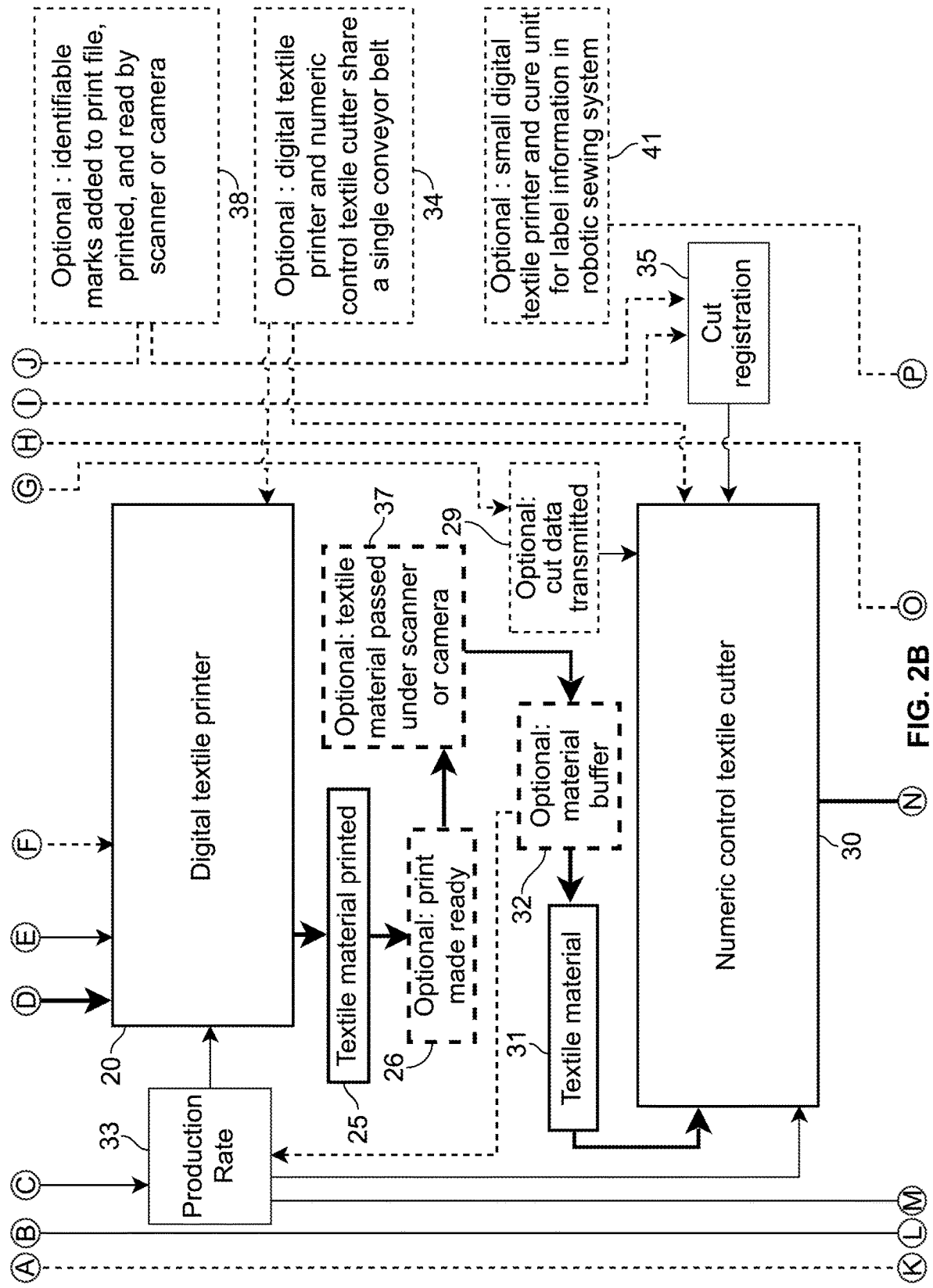
Figure 2C:
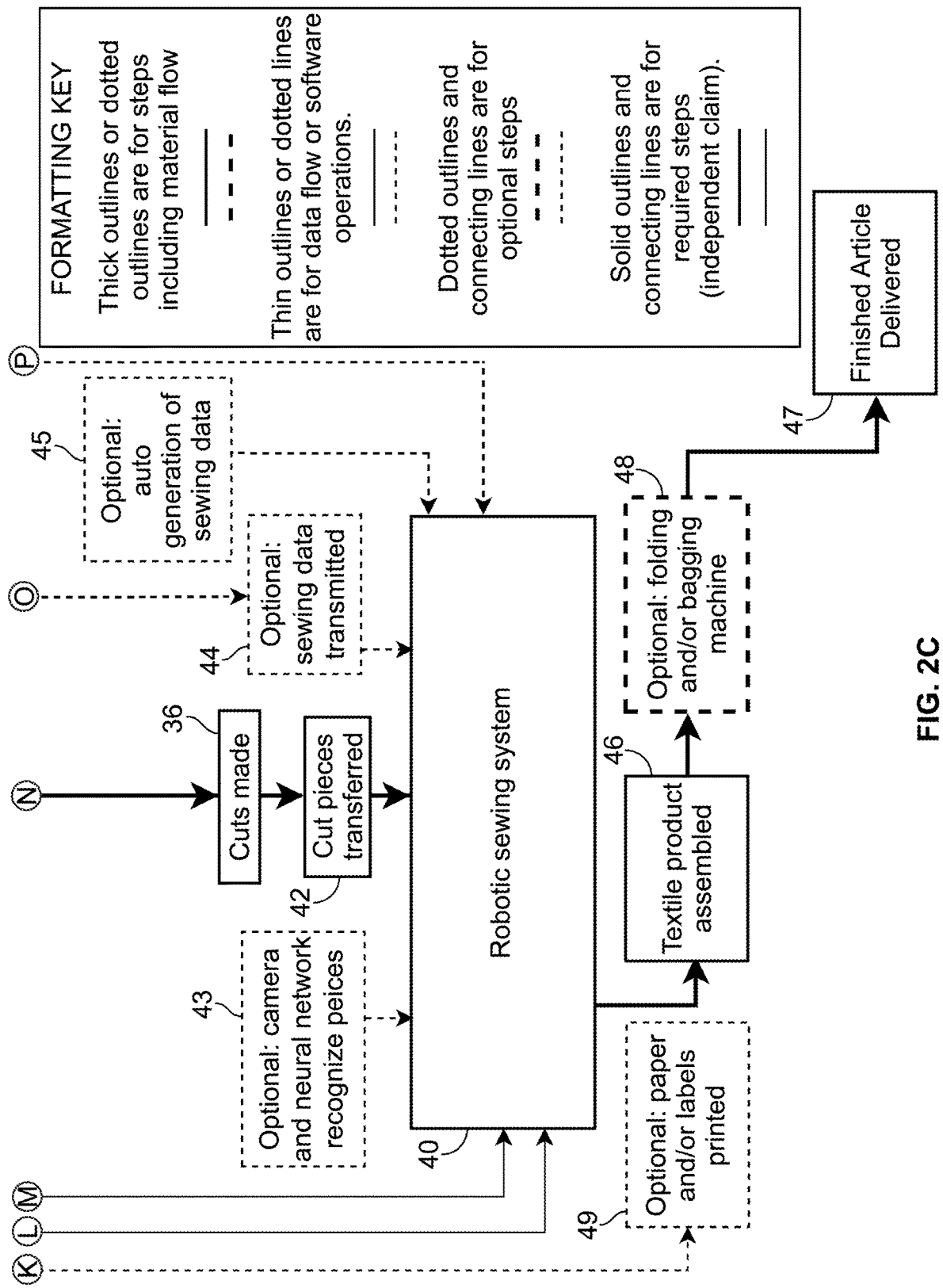

FIG. 1 Illustrates an exemplary environment for implementing the systems and methods described herein for producing textiles. FIG. 2 is another exemplary environment for implementing the systems and methods described herein for producing textiles. The exemplary environment may include a management tool. The management tool 10 may be implemented on a computer, such as a laptop computer, a desktop computer, a server, a tablet computer, a workstation, a mobile device (for example, but not limited to, a cellular device), or the like. The management tool 10 includes memory for storing data and machine-readable instructions. The memory may be implemented, for example, as a non-transitory computer storage medium, such as volatile memory (for example, but not limited to, random access memory), non-volatile memory (for example, but not limited to, a hard disk drive, a solid-state drive, or the like), or a combination thereof. The management tool 10 may include a processor that may be configured to access the memory and execute the machine-readable instructions stored in the memory. The processor may be implemented, for example, as one or more processor cores. In the present example, although the components of the management tool 10 are illustrated as being implemented on the same system, in other examples, the different components could be distributed across different systems and might communicate, for example, over a network, including a wireless, a wired, and a combination thereof.

The management tool 10 may be configured to accept the image data 8 representing the finished appearance of the garment in the shapes of the sewing pattern pieces, initiate the production process by sending these images to the printer, communicate any other information required to other equipment in the production line depending on the configuration, and coordinate the transit of materials from machine to machine to complete production. The image data comprises information specifying the final appearance, or colorization, of the sewing pattern pieces, and could also contain the shape of the sewing pattern pieces of the goods as well. The image data 8 could be comprised of a single computer file combining the required information, a subset of a file which also contains additional information, or the combination of multiple files that in aggregate comprise the required information. Alternately, the image data 8 could comprise only the image elements but not the background color(s), and also specify solid color(s), gradient(s), pattern (s), or image(s) with which to fill all areas not occupied by these specified image elements. The image data 8 may be transmitted 13 to the management tool 10 via a human user selecting the required image data 8, ie, through a computer user interface, or through automated means such as a hot folder or an application programming interface, or retrieved by the management tool from shared shared memory (ie, Network Attached Storage) or a database. The image data 8 may be stored in the memory. In some examples, to facilitate rescaling and other elements of production such as the automated creation of offset paths, the image data 8 may include both vector and raster elements 9, such as vector paths for the boundaries of the sewing pattern elements. The image data 8 may be transmitted 13 to the management tool 10. Other files relevant to the textile product being produced may be transmitted 14 to the management tool 10 in combination or individually with the image data 8, including but not limited to, cut files for the numeric control textile cutter to cut the outlines of the sewing pattern, data specifying the location of the cut paths relative to the textile, the machine instruction code files for the robotic sewing system to control the manipulation and sewing of the cut sewing pattern pieces, the location of the cut pattern pieces relative to the textile, metadata files, production quantities, order information, invoices, shipping information, and a combination thereof.

For print runs where the design elements may be identical, but the item sizes change (for example, different garment sizes), the management tool 10 may include a functionality of automatically adapting the design elements 15 to fit a sewing template for each item. For example, extending or retracting the background and trimming the background to fit the different sewing pattern(s), and scaling and/or shifting the position of decoration elements such as graphics and text to best fit the size of each sewing pattern element of the sewing patterns for goods of different sizes and styles. As a specific non-limiting example of adapting a design, consider adapting image data 8 for the aforementioned team sports shirts. A design could be transmitted to the management tool 10 containing the sewing pattern for an adult medium tee shirt. The graphic of the team logo for the front may be a separately identifiable element of the image data 8, i.e., a graphic element within the file with an identifiable tag such as "Front Art." The background color fill may also be tagged, such as "Front Background Color." The sewing pattern shape for the front fabric panel may be specified with a vector path. The order information sent to the management tool 10 may include the information that this same design is also printing on another shirt size, for example, adult large shirts in the same style, without providing image data 8 for the adult large shirts. The management tool 10 may then retrieve the template for the adult large shirt. The management tool 10 may compare the width of the sewing pattern piece for the front of the medium shirt to the width of the sewing pattern piece for the front of the large shirt and scale the size of the graphic of the team logo for the front of the large shirt based on a mathematical formula. Similarly, placement of the graphic on the front fabric panel for the large shirt may be determined by a mathematical formula based on the position of the placement of the graphic within the provided image data for the medium shirt and a comparison of the size of the medium shirt to the large shirt. The background area of the sewing pattern shape for the front fabric panel of the large shirt may be filled with the same color as the medium shirt. In this way, the size and placement of graphic elements and the backgrounds are adapted to the sewing patterns for different sizes and styles of goods.

In some examples, the management tool 10 may include optional queue management functionality 16 to efficiently manage consecutive jobs. Queue management functions may include, but are not limited to: the ability to group individual jobs into orders, the ability to set or change print quantities, the ability to reorder the sequence in which the jobs in the queue will be produced, the ability to pause production, the ability to resume production, the ability to delete items from the queue, a graphical preview of queued jobs by image data 8, a graphical preview of queued jobs by final appearance, estimates of consumables to be used and cost to process jobs in the queue, a history of consumables used and cost, and a combination thereof.

In some examples, the management tool 10 may be configured to perform an optional imposition of the elements 17 within a single sewing pattern or across the elements of the sewing patterns for many jobs in the queue. In some examples, the management tool 10 may be configured with a raster image processor (RIP) software. Example software includes, but is not limited to, Onyx, Colorburst, Image Print, EFI, Wasatch, Caldera, Ergosoft, Ghostscript, Harlequin, ColorPRINT, Mercury, and GhostPCL. Imposition may include the ability to arrange elements to be printed to maximize the efficiency of material usage. For example, when there are many different graphics to be printed on a substrate of a given size, and/or the elements may be arranged arbitrarily, the management tool 10 may arrange the elements to minimize material waste of the substrate.

The exemplary environment may further include a digital textile printer 20 connected with and/or integrated with the management tool 10. The management tool 10 may be configured to transmit 22 all or a portion of the image data 8 to the digital textile printer 20. The management tool 10 may be integrated into the digital textile printer 20, which may be separate but local to the digital textile printer 20, and/or provided remotely from the digital textile printer 20. For example, the management tool 10 may be located in the same room as the digital textile printer 20 or in a different room and/or building as the digital textile printer 20. In some examples, the management tool 10 may transmit the image data 8 to the digital textile printer 20 using one or more of an intranet, the Internet, Bluetooth, cellular, the Ethernet, USB cables, etc. Additionally or alternatively, the management tool 10 may be integrated into the digital textile printer 20, e.g., using software and/or firmware stored by the digital textile printer 20 and/or a separate module integrated into the digital textile printer 20.

An uncolored textile material will serve as the substrate material to be printed on by the digital textile printer 20. This textile material may be loaded 23 (e.g., by a human) onto the digital textile printer 20 for printing. This textile material is the material that will physically comprise the bulk of the finished textile product, possibly but not necessarily excluding certain items such as buttons, rivets, appliqués, or other notions added to the primary textile. In some examples, the textile material may be initially pretreated 24 for purposes of aiding ink adhesion, decreasing cure time, increasing color saturation of the inks, water resistance, stain blockers, and/or other benefits. In an example, the pretreatment may be applied by machine in a separate step prior to loading in the digital textile printer, or applied by the digital textile printer, or the textile material may be purchased already pretreated.

The digital textile printer 20 prints the image(s) 25 contained in the image data 8 to the textile material. Some digital textile printers may be configured to print on both sides of a substrate 21. In such a configuration, the digital textile printer may be configured, for example, to print graphics that include information, including, but not limited to, garment label information such as brand, care information, fabric type, and/or country of origin, an order number, a QR code, a web address to reorder, a production date, an owner's name, a gift message, and a combination thereof on the reverse side of the textile material 31, so they will end up on the inside of the finished textile product. As one example, this information could be prepared and assembled in advance and provided to the management tool 10 as image data 8 exactly like the image data 8 for the fronts of the textile pattern pieces. Or it could be supplied to the management tool as metadata with the image data 8, or pulled from a database by the management tool 10, and laid out by the management tool 10 according to a template.

The digital textile printer 20 may be configured to print the images on the uncolored textile material based on the image data 8. In some examples, the inks are printed directly from an inkjet print head of the digital textile printer onto the uncolored textile material. Some ink processes such as dye sublimation include a 2-step process where the inks are printed to a transfer carrier and then transferred to the textile material.

In some examples, a finishing processing may be applied to the printed textile material to make the print ready 26 for cutting and sewing, including, but not limited to, drying, steaming, curing, fixing, washing, and a combination thereof. Dye sublimation prints may exit the digital textile printer 20 completed. Pigment inks may be dried and cured with a conveyor heat dryer or heat calender as the textile material exits the digital textile printer 20. In some examples, the digital textile printer 20 may be configured with a heater dryer and thereby eliminate the need for the conveyor heater dryer. Other inks, including some dye inks such as reactive and acid based inks, may require washing and then drying. Some inks require a multi-step curing process such as steaming, washing, and drying. Pigment, reactive, acid, and dispersion inks may be printable via the digital textile printer 20 and may have their own associated "finalization of print" processes depending on the printer and ink set. Any of these processes are regularly performed continuously on the roll of textile material exiting the digital textile printer to yield a finished printed textile material 31 ready for cutting and sewing.

The exemplary environment may further include a numeric control textile cutter 30. The roll of printed textile material 31 output from the digital textile printer 20 may serve as input to the numeric control textile cutter 30. In some examples, the printed textile material 31 may be passed through a buffering system 32 between the digital textile printer 20 and the numeric control textile cutter 30 to aid in coordinating feed rates between the digital textile printer 20 and the numeric control textile cutter 30. A buffering system takes up extra material in the event that the feed rate of the digital textile printer 20 outpaces the feed rate of the numeric control textile cutter 30. This buffered material also serves as a reserve in the event the feed rate of the numeric control textile cutter 30 outpaces the feed rate of the digital textile printer 20. In one implementation, the buffering system may include one or more dancer roll assemblies for achieving this. In a non-limiting example, active dancer roll assemblies may be configured to communicate information regarding a current amount of buffered printed textile material 31 back to the management tool 10 to aid in coordination of feed rates.

The management tool 10 may be configured to synchronize a production rate 33 by coordinating material transit rates of at least the digital textile printer 20 and the numeric control textile cutter 30 to operate within tolerance capacity of the buffer of material between the machines. For example, if a sheet of material transits through two machines and the feed rates are not synchronized, the material may either tear, pile up, and/or damage one or both machines. In a non-limiting example, the management tool 10 may be configured to receive data from the dancer roll assembly indicative of an amount of buffered material. When the amount of buffered material nears maximum capacity, the management tool 10 may be configured to send a pause data to the digital textile printer 20 to cause the digital textile printer to pause. As the digital textile printer 20 is paused and the numeric control textile cutter continues to feed textile material, the buffer will reduce. When the backlogged buffer of textile material clears to a certain predetermined allowance, the management tool 10 may be configured to send resume data to the digital textile printer 20 to resume. In some examples, when the buffer approaches zero excess material, the management tool 10 may be configured to send the pause data to the numeric control textile cutter 30 causing it to pause. When a predetermined amount of buffered textile material becomes present again, the management tool 10 may be configured to send the resume data to the numeric control textile cutter 30 causing it to resume. For example, in this way the management tool 10 may synchronize a transit rate of material between two belt-feed machines. For example, if the management tool 10 pauses the belt on a first machine and a second machine keeps feeding material, that clears any backlog of material buffered between the machines.

In some examples, the management tool 10 may be configured to control the digital textile printer 20 and/or the numeric control textile cutter 30 to slow down and speed up the feed rates of the respective machines without necessarily stopping either. In another example, for a highly integrated workflow, the method of synchronizing the transit rates could include an integration of the digital textile printer 20 and the numeric control textile cutter 30 to share a single belt 34 carrying the textile material.

Once the printed textile material 31 has transited to the numeric control textile cutter 30, the numeric control textile cutter 30 may be configured to cut out one or more elements of a sewing pattern with the cuts registered 35 to prints. There may be varied means of registration to provide the cut requirements, one being an offset path 18 printed around the border of each element of the sewing pattern. This offset path 18 may be added by the management tool 10 prior to printing, or in other examples form part of the image data 8 provided to the management tool 10. In some examples, a scanner or camera 37 may be positioned between the digital textile printer 20 and the numeric control textile cutter 30 to scan the printed textile material 31 and read these external paths. The offset amount of the paths is compensated for by shifting the cut path back towards each sewing pattern piece by the same amount it was shifted out before printing. The compensated path is used to perform the cuts. An alternative example for registering the cuts may include the digital textile printer 20 being configured to print uniquely identifiable markings 38 on the textile material outside the bounds of the printed sewing patterns. Such markings might include or be solely comprised of bar codes, Quick Response codes, or other commonly used machine readable markings. The identifiable markings 38 may be read by, for example, one or more optical scanners of the numeric control textile cutter 30. The locations of the sewing pattern pieces, as sent by the management tool 10 to the digital textile printer 20, may also be used to generate the cut paths, which may be sent 29 by the management tool 10 to the numeric control textile cutter 30. The identifiable markings read by the numeric control textile cutter 30 may be used to match the location of the cut paths sent by the management tool 10 to locations on the printed textile material 31. Once the numeric control textile cutter 30 performs the cuts 36, the result is the colorized cut sewing pattern pieces 42 to be transferred.

The exemplary environment may include a robotic sewing system 40. The numeric control textile cutter 30 and the robotic sewing system 40 may be configured so the cut sewing pattern pieces are transferred 42 to the robotic sewing system 40.

Possible means of transfer may include a belt of the numeric control textile cutter 30 extending underneath lifting arms of the robotic sewing system 40. Other possible means of transfer could include humans moving the cut pieces from the numeric control textile cutter 30 to the input area of the robotic sewing system 40.

The sewing data comprises the machine instruction code for the robotic sewing system 40 to assemble a product from the cut sewing pattern pieces. The robotic sewing system 40 could obtain the sewing data by having the management tool 10 transmit it 44. Alternately, the robotic sewing system may contain a database of sewing data, retrieve sewing data from an external database, or generate sewing data in software.

Possible means of associating cut sewing pattern pieces with sewing data include the cut sewing pattern pieces being recognized by a scanner or camera 37 connected to the robotic sewing system 40. A computer neural network 43 may recognize each of the cut sewing pattern pieces by aspects such as size, shape, colorization, and location and associate each with the equivalent sewing data for the robotic sewing system to assemble the textile product. An example neural network to recognize items moving down a conveyor is described in "EXPERIMENTAL APPLICATIONS OF ARTIFICIAL NEURAL NETWORKS IN ENGINEERING PROCESSING SYSTEM" by S. Dadvandipour published in the Institute of Information Engineering, University of Miskolc, Egyetemváros, 3515, Miskolc, Hungary, which is incorporated by reference herein.

Another example of a possible means of associating the cut sewing pattern pieces with sewing data includes the robotic sewing system 40 using optical scanners to read regularly spaced uniquely identifiable markings 38 on the textile material outside the bounds of the printed sewing patterns to determine locations on the textile material. This location awareness within the textile material could be combined with the management tool 10 sending the sewing data for the associated sewing pattern pieces. Alternately location awareness within the printed textile material 31 could be combined with the management tool 10 sending data denoting the specific pattern each piece corresponds to. The robotic sewing system 40 may then retrieve the sewing data for the specified specific pattern from the management tool or a database. In another example, the robotic sewing system 40 may be configured to scan the incoming cut sewing pattern pieces, or be sent a copy of the information scanned by the scanner of the numeric control textile cutter 30, and use software to make assumptions about the required sewing and generate the sewing data 45. Rules for the generation might start with comparing the shape of an initial cut sewing pattern piece as determined by optical imaging to a database of shapes for similarity using a shape similarity algorithm. For example, finding that the first cut sewing pattern piece is likely a tee shirt front. A possible heuristic for grouping this with other relevant cut sewing pattern pieces might be assuming that for each cut sewing pattern piece all other pieces required to complete the product will be adjacent, i.e., if a pattern piece in the shape of a shirt front panel is found, pattern pieces for a shirt back, collar, and two sleeves will be found placed in areas of the textile material adjacent to the initial piece or other related pieces. An additional example heuristic might be to check the length of the overlapping edges of the contiguous pieces where they may be sewn to ensure the lengths are equal, and thus likely pattern pieces from the same textile product size and style. Another heuristic for associating the separate cut sewing pattern pieces for a textile product might be that the image data 8 from adjacent edges may be compared for similarity. To compare for similarity, if the adjacent data is a solid color, the color may be compared for similarity. If the adjacent data is not a solid color, an image alignment algorithm may check for probable alignment. Once all cut sewing pattern pieces required to produce a single textile product are found and associated, the robotic sewing system 40 may load generic assembly instructions for the item type, as identified by matching the shape of the first cut sewing pattern piece, in this instance, a tee shirt. For the example of the t-shirt, the generic instruction might be to sew the sides of the front to the sides of the back excepting the sleeve areas, then sew the collar around the top of the front and back, then sew the sleeves to the openings in the sides. The generic instructions may be customized to the exact lengths and shapes of the pieces identified to generate the required machine code to move and sew the pieces appropriately.

In some examples, the robotic sewing system 40 may be configured to generate production capacity status data and communicate this data to the management tool 10. The management tool 10 may be configured to coordinate a production rate 33 with the digital textile printer 20 and the numeric control textile cutter 30. If the robotic sewing system 40 is nearing operational capacity and will not be capable of accepting new pieces coming in from the numeric control textile cutter 30, the management tool 10 may send stop data or slow-down data to the numeric control textile cutter 30 causing it to stop or slow. Such a command may initiate the sending of additional commands to also stop or slow the digital textile printer 20 as necessary depending on the current amount of buffer of material between the digital textile printer 20 and the numeric control textile cutter 30. Similarly, start data or speed-up data may be sent to the numeric control textile cutter 30 and/or the digital textile printer 20 when the robotic sewing system 40 regains sufficient capacity to accept incoming cut sewing pattern pieces.

The robotic sewing system 40 assembles the textile product 46 from the cut sewing pattern pieces.

In some examples, the completed textile product output from the robotic sewing system 40, may be configured to feed directly into a garment folding and/or bagging machine 48 to be delivered as a finished article 47.

Although examples are illustrated herein wherein a double-sided digital textile printer is used, in other examples, a single-sided digital textile printer may be used. Thus, in some examples, instead of using the double-sided digital textile printer, inside printing could be achieved via a small printer, including, but not limited to, an inkjet printer, and/or a small curing device 41 (e.g., a flash unit), as part of the robotic sewing system 40 to print inside the textile product.

In some examples, the exemplary environment may include one or more paper printers 49. In an example, the end of the robotic sewing system could be configured with the printer which may be in communication with the management tool 10 to print paper and/or labels for delivery of the order, including shipping label(s), return shipping label(s), invoices, receipts, order summaries, images or mockup images of the textile products, promotional materials, quick response codes, and a combination thereof. Data transmitted back to the management tool 10 from the robotic sewing system 40 communicating which items are completed at what time may allow the management tool 10 to coordinate the printing of these materials at the printer in conjunction with the completion of the goods associated with them to be delivered as the finished article 47.

Accordingly, the management tool 10, together with physical connecting elements (e.g., as examples, a buffer mechanism between the digital textile printer 20 and the numeric control textile cutter 30, and the numeric control textile cutter 30 extending underneath the lifting arms of the robotic sewing system 40) and data transmission between the elements detailed herein, may allow the textile to transit from machine to machine for an automated production process controlled by a management tool 10.

The systems and methods described herein provide for a technical solution that addresses shortcoming of existing approaches for article production. For example, according to the systems and methods described herein, the harvested and woven cotton may be shipped directly to garment decorators who may perform all remaining steps to provide customers with finished goods. As such, the systems and methods herein may eliminate the steps of the blank goods trade and current manufacturing processes. Assume again the previous example of uniform shirts consisting of a blue tee shirt with a multi-color print on the front and individual names and numbers for each team member on the back. Currently, the cotton might be grown in and woven into fabric in the United States. It may then be shipped overseas, and vat-dyed blue. The fabric may be unrolled, cut into panels, and stacked many layers thick. These layers may be placed on a vacuum table and compressed. The compressed layers may be moved to a numerical control fabric cutter that may cut the identical fabric pattern for a single size and style of shirt through the entire stack of material. The resulting cut sewing pattern pieces may then be assembled by hand on sewing machines and other equipment, resulting in finished blank goods. These goods may be shipped as palette loads of cases of identical goods to the manufacturer's warehouses in the US. The manufacturer may resell these goods to wholesalers, shipping them and warehousing them again. Finally a garment decorator may purchase the goods from a wholesaler, who need to pick each style, color, and size combination in the ordered quantities from their stock and ship them to the garment decorator. As such, the systems and methods describe herein eliminate the need for current decorated apparel methods, by permitting the final design elements to be incorporated concurrently with an initial step of textile background colorization or patterning, and thereby overcoming the technical challenges associated with existing techniques for textile printing. The systems and methods described herein combine the currently distinct steps of coloring the material for the item prior to sewing and then decorating the blank goods.

In existing approaches for textile printing, performing the decoration step after coloring the textile comprising the entire product is often complicated by the difficulty of obtaining an opaque print on an already colored textile material. Screen printing colored textiles often requires relatively expensive and difficult to work with white inks, and multiple layers of ink printed with flash-cure drying in between. Direct to Garment printing on colored fabrics requires a pretreatment step and an expensive titanium-dioxide based white ink prior to overprinting with colored inks. The systems and methods described herein reduce this to a single step of colorizing white fabric to the final appearance and thereby bypass the need to color over an existing color of the textile, resulting in a reduction of the need for opaque inks.

According to the systems and methods described herein, garment decorators may be allowed to bypass the purchasing of blank goods, thereby bypassing, out-of-stock situations at suppliers, the need to rapidly obtain additional stock to replace misprints or for rush orders, the limited range of background color and pattern options available on blank goods, and limited size, style, material, and fabric color/pattern combinations available in blank goods.

The systems and methods described herein remove many process restrictions of current existing techniques. For example, the background no longer needs to be a flat color, a combination of flat colors (different sleeves and body), or a recurring pattern. The advantages of the systems and methods described herein permit the background to be any printable graphic, such as a non-repeating pattern, a pattern uniquely aligned to the shape of the finished good, a gradient, or an image. An additional advantage of the system and methods described herein is the removal of restrictions on print size and placement inherent to competing processes. Current processes such as screen printing and direct to garment printing also have issues with wash-fastness. They may fade, peel, crack, or wash out. The system and methods described herein permit the durability of the decoration to be brought up to that of the material color.

Screen printing and direct to garment printing have a large number of limitations and additional complexities introduced by different textile types (ie polyester, cotton, viscose, bamboo, wool, blends). The disclosed systems and methods may work on any fabric printable on digital textile printers, which includes all popular garment fabrics.

The systems and methods herein also simplify the practice of decorating shirts, greatly reducing labor inputs.

Most of the decorated apparel market is for tee shirts. Most tee shirts come in solid colors. And bulk dying the fabric prior to cutting and sewing is an order of magnitude cheaper than colorizing it with a digital textile printer, even for moderate run sizes. Most tee shirt blank goods are produced in very large runs, making the systems and methods herein uneconomical for the production of blank goods. The most common current technique for tee shirt production is bulk fabric dying, followed by bulk cutting on a multi-layer numeric control textile cutter working on compressed material to produce hundreds of sewing pattern pieces at a time, followed by sewing the garments. Decoration is then performed in separate steps. The systems and methods described herein eliminate the final decoration procedure on the blank goods, which makes the introduction of a digital textile printer to the beginning of the process advantageous despite the ink costs for digital textile printers being higher than that of vat dying fabric.

What have been described above are examples. It is, of course, not possible to describe every conceivable combination of components or methodologies for purposes of describing the examples of the disclosure described herein, but one of ordinary skill in the art will recognize that many further combinations and permutations of the examples are possible. Accordingly, the examples described herein are intended to embrace all such alterations, modifications and variations that fall within the scope of the appended claims and the application. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means based at least in part on. The term "textile material" as used herein means any material used as the primary constituent of clothing, bags, backpacks, handkerchiefs, or other items that are frequently decorated using screen printing and competing techniques. While these items are currently made almost exclusively from textiles, future innovations in materials science may create non-textile materials for the same use cases. The term "textile material" is not intended to be limiting. It reflects current use. If, for instance, a non-textile material were to become popular for making apparel, it could be used with these methods and systems as well.

What is claimed is:

1. A method, comprising:
   receiving, at a management tool, image data, wherein the image data comprises a colorization of all elements of a textile product in a shape of a sewing pattern for the textile product;
   transmitting the image data to a digital textile printer;
   creating, at the digital textile printer, prints and colorization on textile material concurrently to generate printed textile material based on the image data, wherein the printed textile material comprises the shape of the sewing pattern;
   providing, at the digital textile printer, the printed textile material to a numeric control textile cutter;
   registering cuts made by the numeric control textile cutter to the shape of the sewing pattern;
   cutting, at the numerical control textile cutter, the shape of the sewing pattern to create cut sewing pattern pieces;
   transferring the cut sewing pattern pieces to a robotic sewing system;
   receiving, at the robotic sewing system, information for assembling a sewn textile product based on the cut sewing pattern pieces; and
   assembling, by the robotic sewing system, the textile product based on the cut sewing pattern pieces to create the sewn textile product corresponding to a finished article.

2. The method of claim 1, wherein the management tool synchronizes a material transit rate of the digital textile printer with a material transit rate of the numeric control textile cutter and/or synchronizes the material transit rate of the digital textile printer and the material transit rate of the numeric control textile cutter.

3. The method of claim 1, further comprising receiving, at the management tool, one or more of a cut path data for the numeric control textile cutter, a cut path data related to printed markings for the numeric control textile cutter, locations of the sewing pattern pieces relative to the printed markings, sewing data for the robotic sewing system, order information, invoices, shipping information and labels and papers to print at an end of a line.

4. Method of claim 1, further comprising adapting the elements of the image data to fit other sewing patterns for other sizes and styles of textile.

5. The method of claim 1, wherein the management tool is configured for queue management, the management comprising:
   grouping image data into an order;
   setting a quantity to be printed;
   reordering items within a queue;
   pausing a production;
   resuming a production;
   deleting items from the queue;
   previewing the sewn textile product;
   viewing final colorization of all elements of the sewn textile product in the shape of the sewing pattern;
   estimating consumables to be used and cost to process jobs in the queue; and
   determining history of consumables used and cost.

6. The method of claim 1, performing, at the management tool, imposition of the elements of the shape of the sewing pattern of one or more jobs.

7. The method of claim 1, wherein the digital textile printer is configured to print on both sides of the textile material.

8. The method of claim 1, further comprising one of drying, curing, fixing, washing, and making permanent the prints of the digital textile printer.

9. The method of claim 1, further comprising increasing a buffer of the textile material between the digital textile printer's output and the numeric control textile cutter's input to increase a tolerance for variations in feed rates between the digital textile printer and the numeric control textile cutter.

10. The method of claim 2, wherein synchronizing the material transit rate comprises using a single conveyor belt to extend from the digital textile printer to the numeric control textile cutter.

11. The method of claim 1, wherein a registration is aided by the digital textile printer printing a border around the shape of the sewing pattern when performing the printing.

12. The method of claim 1, wherein registering the cuts comprises positioning a visual input device between the digital textile printer and the numeric control textile cutter to recognize visual elements of the shape of the sewing pattern and create cutting paths.

13. The method of claim 12, wherein registering the cuts comprises reading a series of marks on fabric outside the prints by one or more scanners of the numeric control textile cutter to determine coordinates on the fabric relative to the shape of the sewing pattern.

14. The method of claim 1, further including a digital textile printer and cure unit configured to print on a reverse side of the cut sewing pattern pieces.

15. The method of claim 1, wherein the transferring of the cut sewing pattern pieces to the robotic sewing system comprising connecting a camera to a computer neural network programmed to match each element of the cut sewing pattern pieces to a source in the information for assembling the sewn textile product.

16. The method of claim 1, wherein obtaining the information for assembling the sewn textile product comprises generating by the robotic sewing system based on shapes of the cut sewing pattern pieces.

17. The method of claim 1, further comprising folding and bagging, at a garment folding and bagging machine, the textile product, wherein an output of the textile product from the robotic sewing system is an input to the garment folding and bagging machine.

18. The method of claim 1, further providing one or more printers, wherein the management tool is configured to communicate to the one or more printers to print items comprising one of a shipping label, a return shipping label, an invoice, a receipt, an order summary sheet, an image of the sewn textile product, promotional materials, and a combination thereof.

19. A system, comprises:
- a digital textile printer configured to create prints and colorization on textile material concurrently;
- a management tool connected with the digital textile printer, the management tool configured to load image data to the digital textile printer;
- a numeric control textile cutter connected with the digital textile printer;
- a means for connecting an output of the digital textile printer to an input of the numeric control textile cutter;
- a robotic sewing system connected with the numeric control textile cutter; and
- a means for transferring cut sewing pattern pieces output from the numeric control textile cutter to the robotic sewing system, wherein the robotic sewing system is configured to assemble the cut sewing pattern pieces output based on receiving information for assembling.

20. The system of claim 19, wherein the management tool is located remote from the digital textile printer and the management tool transmits the image data to the digital textile printer.

* * * * *